(12) United States Patent
Silvera et al.

(10) Patent No.: US 7,647,228 B2
(45) Date of Patent: Jan. 12, 2010

(54) METHOD AND APPARATUS FOR SPEECH PROCESSING INCORPORATING USER INTENT

(75) Inventors: M. Marketta Silvera, Orinda, CA (US); Leo Chiu, South San Francisco, CA (US)

(73) Assignee: Apptera, Inc., San Bruno, CA (US)

( * ) Notice: Subject to any disclaimer, the term of this patent is extended or adjusted under 35 U.S.C. 154(b) by 251 days.

(21) Appl. No.: 11/276,114

(22) Filed: Feb. 14, 2006

(65) Prior Publication Data

US 2007/0100625 A1 May 3, 2007

Related U.S. Application Data

(60) Provisional application No. 60/733,079, filed on Nov. 3, 2005.

(51) Int. Cl.
 *G10L 21/06* (2006.01)
(52) U.S. Cl. .................. 704/275; 704/257
(58) Field of Classification Search ........... 704/257, 704/275
 See application file for complete search history.

(56) References Cited

U.S. PATENT DOCUMENTS

| | | | |
|---|---|---|---|
| 5,675,707 A * | 10/1997 | Gorin et al. | 704/257 |
| 6,073,102 A * | 6/2000 | Block | 704/275 |
| 6,108,632 A * | 8/2000 | Reeder et al. | 704/275 |
| 6,246,989 B1 * | 6/2001 | Polcyn | 704/275 |
| 6,314,398 B1 * | 11/2001 | Junqua et al. | 704/257 |
| 6,510,411 B1 * | 1/2003 | Norton et al. | 704/254 |
| 6,513,010 B1 * | 1/2003 | Lewin et al. | 704/270.1 |
| 6,850,252 B1 * | 2/2005 | Hoffberg | 715/716 |
| 6,957,213 B1 | 10/2005 | Yuret | |
| 6,999,563 B1 | 2/2006 | Thorpe et al. | |
| 7,092,928 B1 * | 8/2006 | Elad et al. | 706/60 |
| 7,136,854 B2 | 11/2006 | Smith et al. | |
| 7,136,875 B2 | 11/2006 | Anderson et al. | |
| 7,249,018 B2 * | 7/2007 | Ross et al. | 704/257 |
| 7,249,117 B2 * | 7/2007 | Estes | 706/52 |
| 7,487,095 B2 * | 2/2009 | Hill et al. | 704/275 |

\* cited by examiner

*Primary Examiner*—Susan McFadden
(74) *Attorney, Agent, or Firm*—Stevens Law Group; Steven R. Sponseller

(57) ABSTRACT

An audible utterance is received from a user. A procedure determines a user intent associated with the audible utterance and identifies multiple parameters associated with the user intent. The procedure then determines whether any of the multiple parameters associated with the user intent are missing from the audible utterance. If any parameters are missing, an audible response requesting the missing parameters is generated and communicated to the user. If all parameters associated with the user intent are contained in the audible utterance, a response to the user's request is generated and communicated to the user.

19 Claims, 7 Drawing Sheets

METHOD AND APPARATUS FOR SPEECH PROCESSING INCORPORATING USER INTENT

RELATED APPLICATIONS

This application claims the benefit of U.S. Provisional Application No. 60/733,079, filed Nov. 3, 2005, the disclosure of which is incorporated by reference herein.

TECHNICAL FIELD

The present invention relates to processing audible utterances, such as processing a caller utterance containing a specific request.

BACKGROUND

Typically, complex customer service interactions are handled via live agents or through a customer service Web page accessible via the Internet. Examples of complex customer service interactions include interactions in which the user may request information or ask questions related to a variety of different topics. For example, a user may contact a customer service center that handles questions regarding many different types of computers and many different types of software. A particular user may ask questions or request information related to any aspect of the multiple computers and/or software.

Often, users may want assistance with a complex customer service interaction, but the user is presently unable to access the Internet and live agents are unavailable. Existing systems may require such users to call an automated voice-based customer service system. These existing voice-based systems often require the user to navigate through a pre-defined hierarchy of information in an attempt to obtain the information they desire. In a complex customer service situation, navigating through a large, pre-defined hierarchy of information is time-consuming and frustrating to the user. Further, the pre-defined hierarchy of information may be limited in its ability to process certain types of requests, such as setting up user accounts, moving funds into or between financial accounts, etc.

Therefore, it would be desirable to provide a voice-based system that is capable of efficiently handling complex customer service interactions.

BRIEF DESCRIPTION OF THE DRAWINGS

Similar reference numbers are used throughout the figures to reference like components and/or features.

DETAILED DESCRIPTION

The systems and methods described herein generate one or more responses to user requests, such as generating audible responses to audible user utterances. These audible user utterances may be received from a conventional telephone, a cellular phone, a radio, a walkie-talkie, a computer-based telephone system, an Internet-based telephone system, or any other device capable of communicating audible information. In particular embodiments, a "user" is also referred to as a "caller". A user utterance may include, for example, a question, a request for information, or a general statement. User utterances can be any length and are spoken in the natural language of the user.

The systems and methods described herein receive an audible user utterance and process that utterance in a manner that allows the systems and methods to generate an appropriate response to the user. For example, a user may call a bank and ask for funds to be transferred from the user's savings account to the user's checking account. The described systems and methods analyze the user utterance and request additional information from the user, if necessary, to complete the desired transaction. The requested transaction is then processed and a response is communicated to the user confirming the requested transfer of funds.

Particular examples discussed herein refer to receiving user utterances from a telephone or a cellular phone. However, the systems and methods discussed herein may also be utilized to process user utterances received from any source using any type of data communication mechanism. Further, a particular user utterance may be partially or completely stored on a storage device prior to being processed by the systems and methods described herein.

The systems and methods described herein are useful in various environments, such as automated customer service systems, automatic-response systems, telephone-based information systems, or any other system that incorporates voice- or speech-based services. The described systems and methods may be implemented as a stand-alone system or may be incorporated into one or more other systems.

Figure 1:
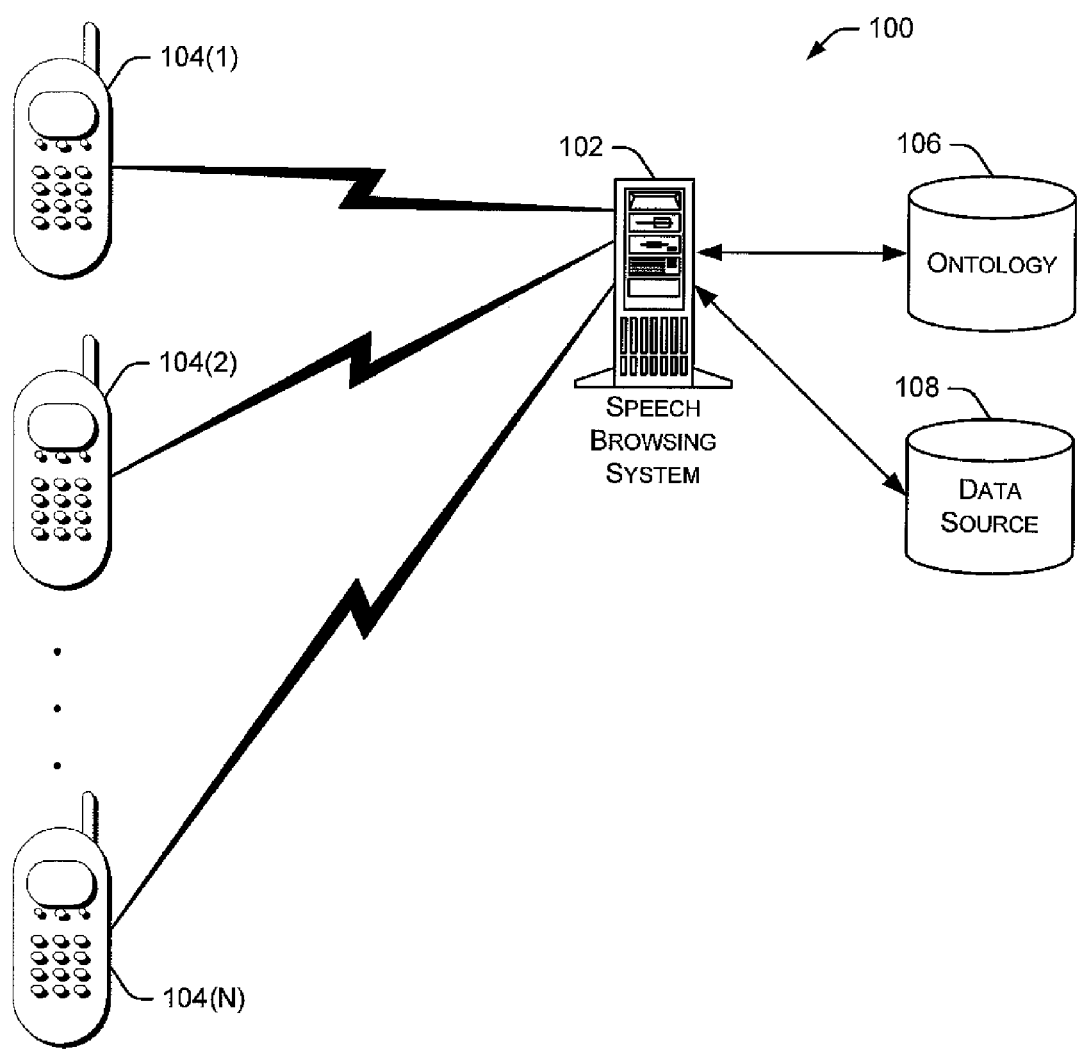
FIG. 1 illustrates an example environment in which the systems and methods discussed herein can be applied.

FIG. 1 illustrates an example environment 100 in which the systems and methods discussed herein can be applied. A speech processing system 102 is coupled to communicate with any number of telephones 104. Each telephone 104 is any type of conventional telephone, cellular phone, or the like that is capable of communicating with speech processing system 102. Speech processing system 102 may also be referred to as a "speech browsing system" or an "audible browsing system". Speech processing system 102 is depicted in FIG. 1 as a server or other computer-based system. In alternate embodiments, speech processing system 102 is implemented using any type of device capable of performing the various functions and procedures discussed herein.

In a particular example, a user of telephone 104(1) (i.e., a caller) provides an audible utterance to speech processing system 102. After processing the caller's utterance, speech processing system 102 returns an appropriate response to the caller's utterance or generates a request for additional information from the caller. Speech processing system 102 is capable of handling multiple such interactions with any number of telephones 104 simultaneously.

Speech processing system 102 is also coupled to an ontology 106 and a data source 108. Ontology 106 is a relationship-based data structure that defines the types of information that may be contained in a caller utterance. Ontology 106 also defines relationships between the various words that may be contained in a caller utterance. Further, ontology 106 classifies certain words (e.g., "Robert", "John", and "Tom" may be classified as common first names). Data source 108 provides various information to speech processing system 102, which is used to process a caller's utterance and generate a response to the caller. Although FIG. 1 illustrates a single ontology 106 and a single data source 108, alternate embodiments may include any number of ontologies and any number of data sources coupled to speech processing system 102.

Figure 2:
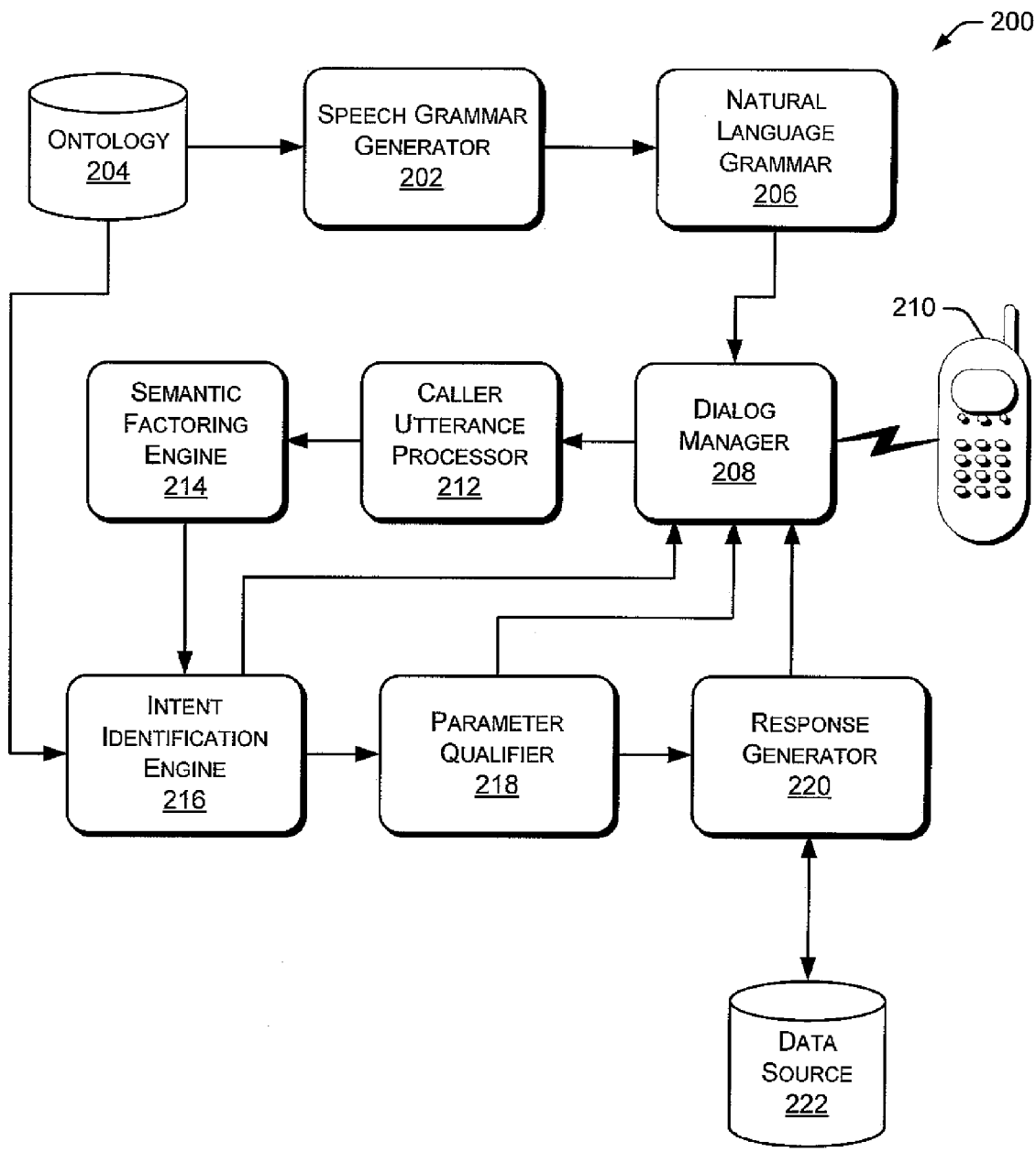
FIG. 2 is a block diagram illustrating various components of an example speech processing system.

FIG. 2 is a block diagram illustrating various components of an example speech processing system 200. Speech processing system 200 may also be referred to as a "speech browser" because it uses a natural language grammar. Thus, a user can say anything or make any request using their own natural language instead of being required to conform to certain language requirements or hierarchy requirements of the system. Speech processing system 200 allows users to browse the information available on the system by asking any question using their own natural language.

A speech grammar generator 202 receives data from ontology 204 and builds a speech grammar that attempts to anticipate what might be contained in a caller utterance. In a particular embodiment ontology 204 is identical to ontology 106 (FIG. 1). Knowing the environment in which speech processing system 200 will operate helps a developer anticipate likely caller utterances. For example, if speech processing system 200 will operate in a bank setting, a developer anticipates caller utterances regarding account balances, account transfers, current interest rates, types of loans available, information about the bank, and the like. Although a single ontology 204 is shown in FIG. 2, alternate embodiments of speech processing system 200 may include any number of ontologies. Additionally, the number of data elements contained in ontology 204 can be increased as needed to support expansion of speech processing system 200. This scalability of ontology 204 supports scalability of the entire speech processing system. Data contained in ontology 204 may be obtained from any number of sources, such as human input, structured data sources, unstructured data sources, and data obtained during testing and/or development of speech processing system 200.

After receiving data from ontology 204, speech grammar generator 202 converts the speech grammar into a natural language grammar 206, which is a compiled version of the speech grammar that can be understood by a computing device or a speech recognition system. This natural language grammar 206 is provided to a dialog manager 208.

Dialog manager 208 communicates with one or more callers via a communication link to a telephone 210 associated with each caller. Dialog manager 208 receives requests from one or more callers and provides an appropriate response to each caller based on processing performed by the speech processing system 200, as described herein. After receiving an utterance from a caller, dialog manager 208 communicates the utterance to a caller utterance processor 212, which processes the raw caller utterance data into a text string. In a particular embodiment, caller utterance processor 212 is a speech recognition system. In other embodiments, a separate speech recognition algorithm or system (not shown) converts the raw caller utterance data into a text string.

Caller utterance processor 212 provides the text string to a semantic factoring engine 214, which identifies key words and phrases in the caller utterance. Key words and phrases may include verbs, adjectives, and other "action" words. Semantic factoring engine 214 also performs "word stemming" procedures to find a root form of a particular word. For example, a text string may include the word "money", which is converted to the root form "dollar". In one embodiment, semantic factoring engine 214 identifies key words and phrases using information in ontology 204, which contains various characteristics associated with words, phrases, and other entries in the ontology.

Speech processing system 200 uses a class-based grammar that is capable of anticipating what will be contained in a caller utterance. When anticipating the caller utterance, the system expects three types of content in the caller utterance: pre-filler statements, content, and post-filler statements. Pre-filler statements are preliminary utterances before the actual question, such as "Hi I want to" or "Uh, hello, this is Bob, can I". The content is the key phrase that contains the question or request, such as "current interest rate on 12 month CDs" or "transfer fifty dollars from my checking account to my savings account". Post-filler statements are additional utterances after the key phrase, such as "ok, goodbye" or "please do this as fast as possible". In one embodiment, a single ontology contains data related to pre-filler statements, content, and post-filler statements. In another embodiment, a separate ontology is used for each of these three types of content.

Semantic factoring engine 214 processes all three types of content discussed above, but filters out the words that are not important to determining the caller's intent. Thus, only the key words and phrases are passed on to an intent identification engine 216. By anticipating the three different types of content, speech processing system 200 can better analyze caller utterances and extract the key words and phrases necessary to determine the caller's intent.

Intent identification engine 216 also receives data from ontology 204 and attempts to identify the intent of the caller's utterance. In a particular embodiment, intent identification engine 216 is implemented using a mapping table to determine the caller's intent. Intent identification engine 216 is also coupled to dialog manager 208 and a parameter qualifier 218. If intent identification engine 216 cannot identify the caller's intent, intent identification engine 216 notifies dialog manager 208, which may request more information from the caller or ask the caller to rephrase their request. If intent identification engine 216 successfully identifies the caller's intent, intent identification engine 216 provides the identified caller intent to parameter qualifier 218.

Parameter qualifier 218 determines whether all parameters necessary to respond to the caller's utterance were provided by the caller. For example, if a caller wants to know the interest rate associated with a particular type of loan, the caller's request must include an identification of the loan type. In this example, the loan type is one of the necessary parameters. Other examples may include any number of different parameters. If parameter qualifier 218 determines that one or more parameters are missing from the caller's utterance, those missing parameters are provided to dialog manager 208, which may request the missing parameters from the caller If parameter qualifier 218 determines that all necessary parameters were provided by the caller, the parameters are provided to response generator 220.

Response generator 220 uses the received parameters, the caller's intent, and information retrieved from a data source 222. Data source 222 can be any type of structured or unstructured data source providing any type of data to response generator 220. For example, if the caller's utterance relates to transferring funds between bank accounts, data source 222 may contain information about the bank accounts and instructions regarding how to implement a transfer of funds. Response generator 220 generates a response to the caller's utterance and provides that response to dialog manager 208, which communicates the response to telephone 210 being operated by the caller.

The speech processing system 200 of FIG. 2 includes various components and devices coupled to one another as shown. In alternate embodiments, any of the components and/or devices shown in FIG. 2 may be coupled to one another in a different manner. Further, any components and/or devices may be combined into a single component or device. For example, caller utterance processor 212 and semantic factoring engine 214 may be combined into a single component. In another example, intent identification engine 216, parameter qualifier 218, and response generator 220 may be combined into a single component or may be combined into dialog manager 208.

Figure 3:
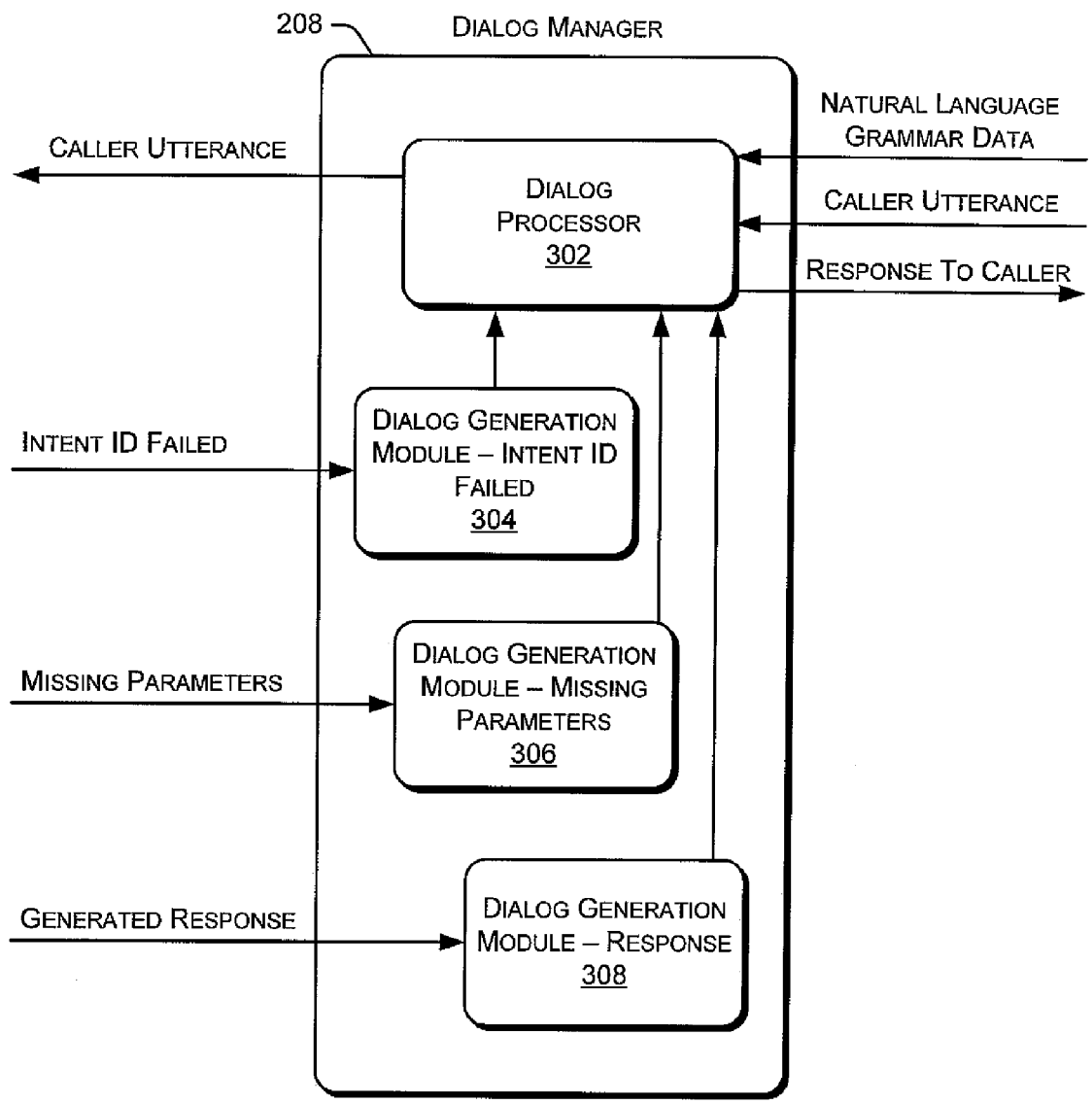
FIG. 3 is a block diagram illustrating various components of an example dialog manager.

FIG. 3 is a block diagram illustrating example components of dialog manager 208. Dialog manager 208 includes a dialog processor 302 and three dialog generation modules 304, 306, and 308. Dialog processor 302 receives natural language grammar data and receives caller utterances from any number of different callers. Dialog processor 302 also receives dialog information (also referred to as "messages") from dialog generation modules 304-08 and uses those received messages to generate responses to the various callers.

Dialog generation modules 304-08 generate different messages or dialog information based on the results of processing each caller utterance received by the speech processing system. Dialog generation module 304 generates messages (e.g., dialog information) resulting from a failure of the intent identification engine 216 (FIG. 2) to identify a caller's intent. The message generated by dialog generation module 304 may ask the caller for more information about their request or ask the caller to rephrase their request. Dialog generation module 306 generates messages (e.g., dialog information) associated with missing parameters identified by parameter qualifier 218 (FIG. 2). The message generated by dialog generation module 308 may ask the caller for one or more parameters that were missing from the caller's original utterance. Dialog generation module 308 generates messages (e.g., dialog information) associated with responses generated by response generator 220 (FIG. 2), such as responses to the caller's utterance.

FIG. 3 includes various components and devices coupled to one anther as shown. In alternate embodiments, any of the components and/or devices shown in FIG. 3 can be coupled to one another in a different manner. Further, any of the components and/or devices shown in FIG. 3 can be combined into a single component or device.

Figure 4:
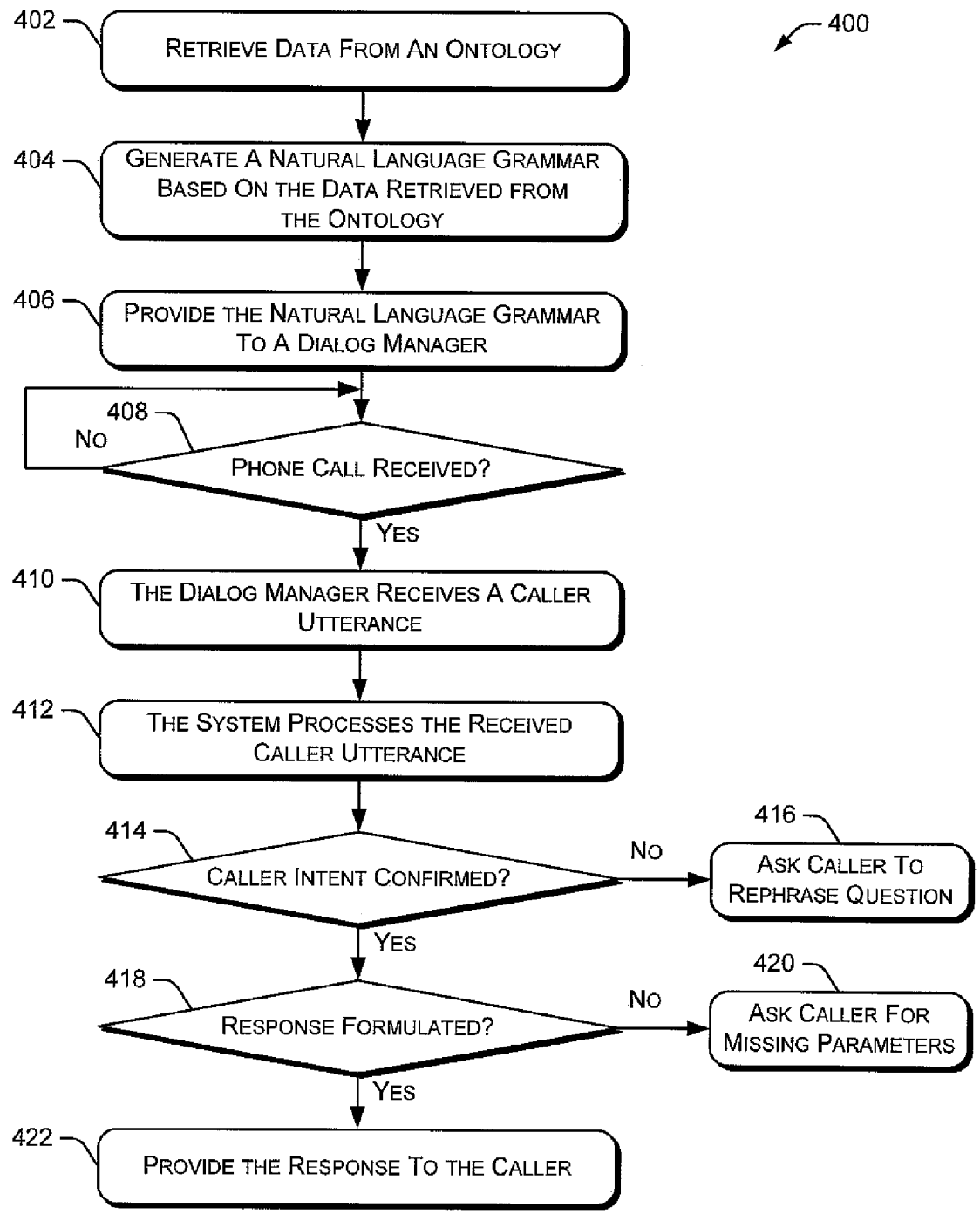
FIG. 4 is a flow diagram illustrating an embodiment of a procedure for responding to caller utterances.

FIG. 4 is a flow diagram illustrating an embodiment of a procedure 400 for responding to caller utterances. Procedure 400 can be implemented, for example, by speech processing system 200 discussed above with respect to FIG. 2. Initially, data is retrieved from at least one ontology (block 402). In certain embodiments, data may be retrieved from two or more different ontologies. The procedure continues by generating a natural language grammar based on the data retrieved from the ontology (block 404). The natural language grammar is then provided to a dialog manager (block 406). At this point, the procedure is ready to begin receiving phone calls and corresponding caller utterances.

When a phone call is received at block 408, the system will typically respond with a greeting such as "Hello, how can I help you today?" This message may be generated and communicated by the dialog manager. In response, the dialog manager receives a caller utterance from the caller (block 408). The speech processing system processes the received caller utterance (block 412) and determines whether the caller's intent has been confirmed (block 414). Additional details regarding the processing of caller utterances and determining a caller's intent are provided below. If the caller's intent has not been confirmed, the procedure branches to block 416, where the caller is asked to rephrase their question or provide additional information regarding their request. After the caller has rephrased their question or provided additional information in a second utterance, that second utterance is processed and provided to the intent identification engine to make another attempt to identify the caller's intent.

If the caller's intent has been confirmed at block 414, the procedure continues by determining whether the speech processing system was able to formulate a response (block 418). To formulate a response, the speech processing system needs to identify all of the appropriate parameters within the caller utterance. If any parameters are missing, a response cannot be formulated. If a response has not been formulated, the procedure branches to block 420, where the caller is asked for one or more missing parameters. As discussed in greater detail below, these missing parameters are identified by a parameter qualifier based on the caller's intent and the caller's utterance. After the caller has provided the missing parameter(s) in an additional utterance, that additional utterance is processed and provided to the parameter qualifier to make another attempt to identify all parameters associated with the caller's intent.

If a response has been formulated at block 418, the procedure provides that formulated response to the caller (block 422), thereby responding to the caller's question or request.

Figure 5:
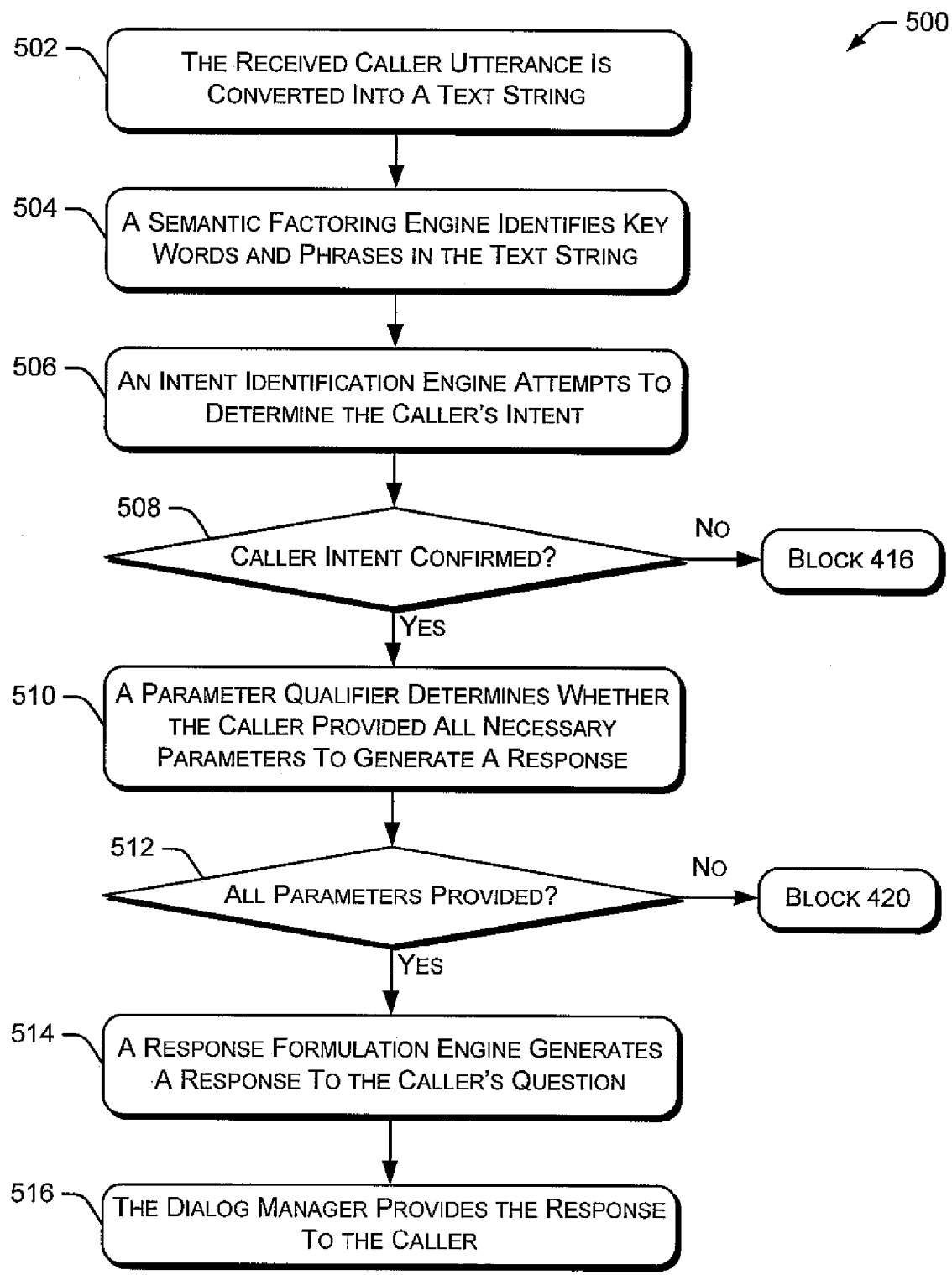
FIG. 5 is a flow diagram illustrating an embodiment of a procedure for identifying a caller's intent and obtaining all parameters necessary to generate a response to a caller utterance.

FIG. 5 is a flow diagram illustrating an embodiment of a procedure 500 for identifying a caller's intent and obtaining all parameters necessary to generate a response to a caller utterance. Procedure 500 can be implemented, for example, by speech processing system 200 discussed above with respect to FIG. 2. Initially, the received caller utterance is converted into a text string (block 502). Next, a semantic factoring engine identifies key words and phrases in the text string (block 504). An intent identification engine then attempts to determine the caller's intent (block 506). A caller's intent can be determined by comparing the identified key words and phrases to data contained in the associated ontology. If the caller's intent has not been confirmed, the procedure branches to block 416 (discussed above with respect to FIG. 4).

In one embodiment, when determining a caller's intent, intent identification engine 216 accesses one or more mapping tables, such as Table 1 below.

TABLE 1

| Condition | Perform |
|---|---|
| If action = transfer and amount > 1 and source is populated and destination is populated | Query 42 |
| If product = bond and request = pricing | Query 17 |
| If action = available balance and account is populated | Query 27 |

For example, if the system identified three key words/phrases ("transfer", "fifty dollars" and "checking"), the system would initially search for conditions in the mapping table that contain all three of the key words/phrases. If a match is found, is the corresponding query is performed. If no condition was found matching the three key words/phrases, the system would search for conditions that contained two of the key words/phrases. If a match is found, the corresponding query is performed.

If no condition was found matching the two key words/phrases, the system would search for conditions with a single key word/phrase. If a match is found, the corresponding query is performed. If no condition was found matching the single key word/phrase, the system would find the closest match in the table using all the key words/phrases. The system would then request one or more missing parameters from the caller.

For example, using Table 1, if the caller stated "I want to transfer sixty dollars to my checking account". The identified key words/phrases are "transfer", "sixty dollars", and "to checking". Thus, the destination account information is missing. The system searches Table 1 for a condition that includes all three key words/phrases. If a match for all three key words/phrases is not found, the system searches Table 1 for a condition that includes two of the key words/phrases. If a match for two key words/phrases is not found, the system searches Table 1 for a condition that includes one of the key words/phrases.

In this example, no match is found in Table 1 when searching for three, two, or one key words/phrases. In this situation, then the system will ask for the missing parameter(s). In this example, the missing parameter is the source account. Thus, the system requests the desired source account from the caller. Upon receipt of the source account from the caller, all parameters of the condition are satisfied and query 42 is performed.

Referring back to FIG. 5, if the caller's intent has been confirmed at block 508, the procedure continues as a parameter qualifier determines whether the caller provided all necessary parameters to generate a response (block 510). If the caller did not provide all of the parameters necessary to generate a response, the procedure branches to block 420 (discussed above with respect to FIG. 4). However, if the caller provided all necessary parameters to generate a response, procedure 400 continues as a response formulation engine generates a response to the caller's question (block 514). Generating a response to the caller's question may include querying one or more data sources (e.g., data source 222) to obtain the data necessary to answer the caller's question. For example, if the caller requests pricing information regarding trading options, the pricing information is retrieved from an appropriate data source. Finally, the dialog manager provides the generated response to the caller (block 516).

Figure 6A:
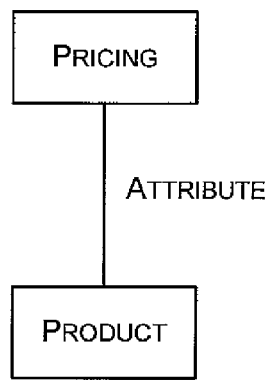
FIGS. 6A and 6B illustrate example data elements contained in an ontology used by the systems and methods discussed herein.
Figure 6B:
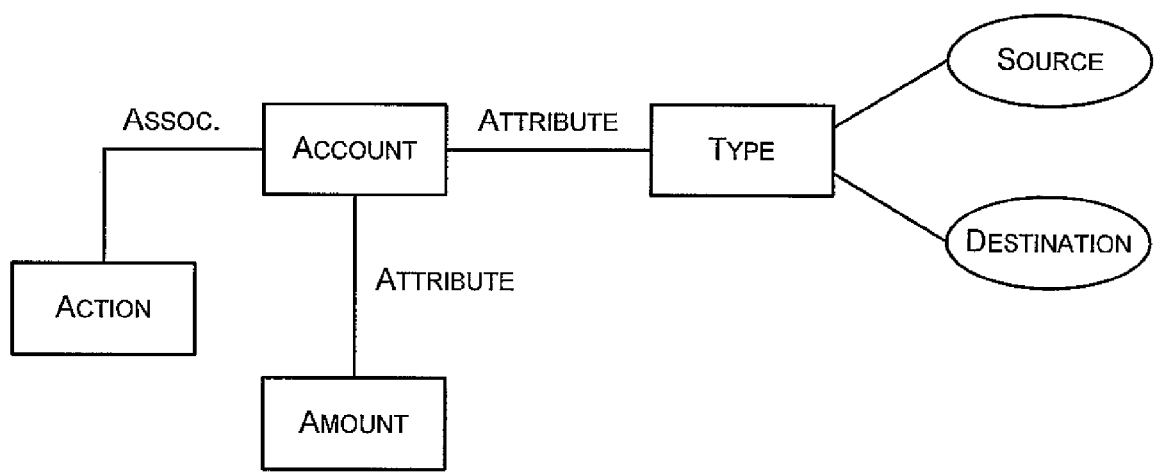

FIGS. 6A and 6B illustrate example data elements contained in an ontology used by the systems and methods discussed herein. In a first example, a caller's utterance includes "How much do you charge for option trades?" In this example, speech processing system 200 identifies "how much" and "charge" as being associated with pricing data. Further, speech processing system 200 identifies "option trades" as being associated with product data. The words "do", "you", and "for" are not contained in the ontology, so those three words are ignored. Thus, the utterance "How much do you charge for option trades" matches the data structure shown in FIG. 6A.

In FIG. 6A, "pricing" is an attribute of "product". By identifying a match with the portion of the ontology data structure shown in FIG. 6A, speech processing system 200 is able to determine the intent of the caller; i.e., to determine the pricing for option trades. As shown in FIG. 6A, this intent contains two parameters: pricing and product. Since the caller utterance contained both parameters, the speech processing system 200 is able to generate a response that answers the caller's question.

In a second example, a caller's utterance includes "I want to transfer fifty dollars from savings to checking." In this example, speech processing system 200 identifies "transfer" as an action to take, identifies "fifty dollars" as an amount, identifies "savings" as an account type, and identifies "checking" as an account type. Further, speech processing system 200 identifies "from" as related to "savings" because it immediately precedes "savings" in the caller utterance, and identifies "to" as related to "checking" because it immediately precedes "checking" in the caller utterance. Thus, the utterance "I want to transfer fifty dollars from savings to checking" matches the data structure shown in FIG. 6B.

In FIG. 6B, "action" and "type" are attributes of "account". Additionally, "type" has two separate fields "source" and "destination", and "action" is associated with "account". In this example, "action" in FIG. 6B corresponds to "transfer" in the caller utterance, "amount" corresponds to "fifty dollars", and the two account types "source" and "destination" correspond to "savings" and "checking", respectively.

By identifying a match with the portion of the ontology data structure shown in FIG. 6B, speech processing system 200 is able to determine that the intent of the caller is to transfer money between two accounts. As shown in FIG. 6B, this intent contains four parameters: action, amount, source account, and destination account. Since the caller utterance contained all four parameters, speech processing system 200 is able to generate a response that confirms the caller's request.

In a different example, if the caller utterance had included "I want to transfer fifty dollars to checking", speech processing system 200 would still be able to determine that the caller's intent was to transfer money between accounts. However, one of the four parameters is missing; i.e., the source account. In this situation, speech processing system 200 would generate a message to the caller requesting the account from which the caller wants to withdraw funds. After the caller provides an appropriate source account, speech processing system 200 can generate a response that confirms the caller's request.

Figure 7:
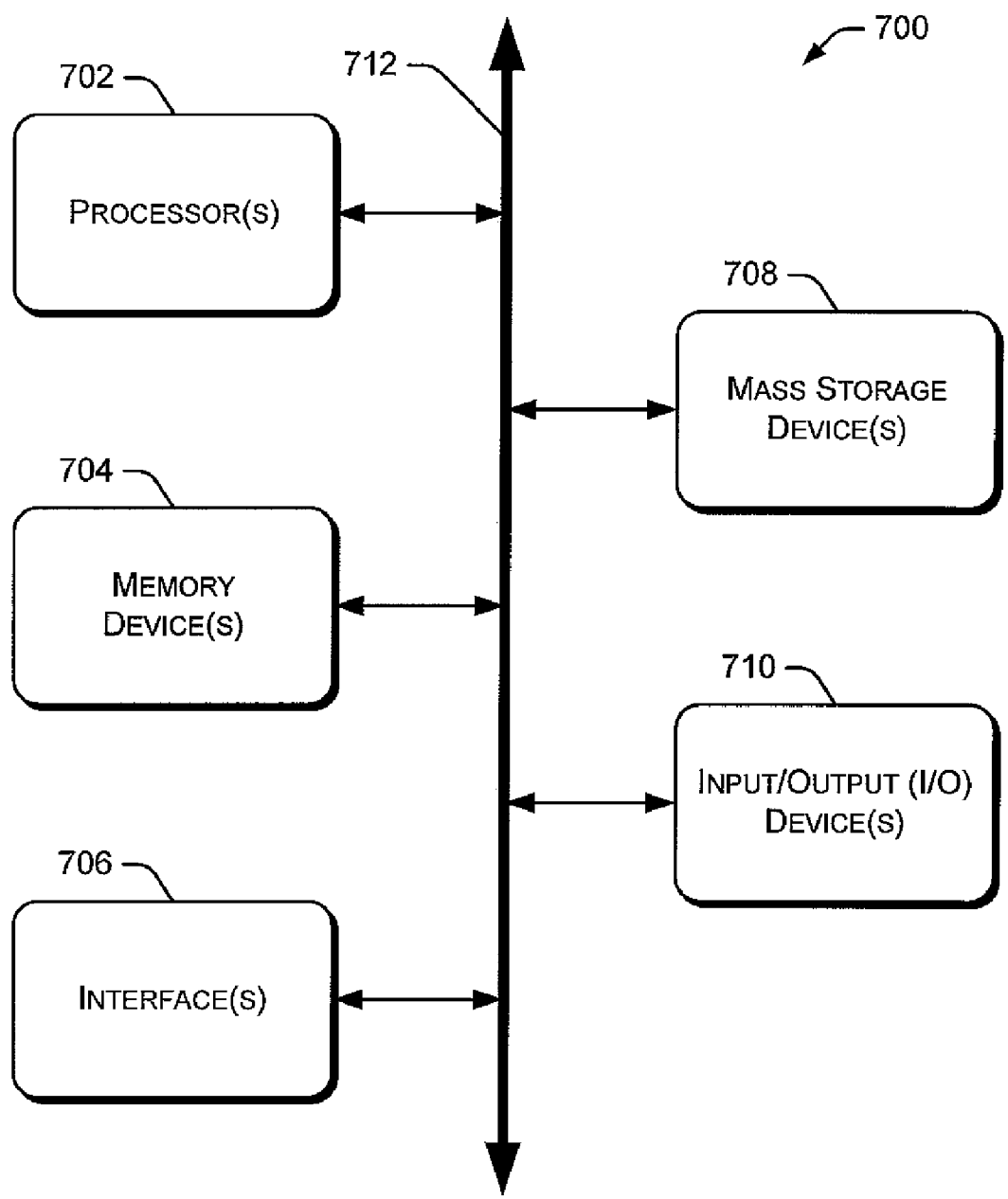
FIG. 7 is a block diagram illustrating an example computing device.

FIG. 7 is a block diagram illustrating an example computing device 700. Computing device 700 may be used to perform various procedures, such as those discussed herein. Computing device 700 can function as a server, a client, or any other computing entity. Computing device 700 can be any of a wide variety of computing devices, such as a desktop computer, a notebook computer, a server computer, a handheld computer, and the like.

Computing device 700 includes one or more processor(s) 702, one or more memory device(s) 704, one or more interface(s) 706, one or more mass storage device(s) 708, and one or more Input/Output (I/O) device(s) 710, all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) and/or nonvolatile memory (e.g., read-only memory (ROM)). Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. Various drives may also be included in mass storage device(s) 708 to enable reading from and/or writing to the various computer readable media. Mass storage device(s) 708 include removable media and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Interface(s) 706 include various interfaces that allow computing device 700 to interact with other systems, devices, or computing environments. Example interface(s) 706 include any number of different network interfaces, such as interfaces to local area networks (LANs), wide area networks (WANs), wireless networks, and the Internet.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
  receiving an audible utterance at a dialog processor;
  determining a user intent associated with the audible utterance using an ontology, wherein the ontology includes a plurality of words that may be contained in audible utterances, and wherein the ontology defines relationships between the plurality of words that may be contained in audible utterances;
  identifying a plurality of parameters associated with the user intent;
  determining whether any of the plurality of parameters associated with the user intent are missing from the audible utterance;
  if any of the plurality of parameters associated with the user intent are missing from the audible utterance, generating an audible response to the user requesting the missing parameters; and
  if all parameters associated with the user intent are contained in the audible utterance, generating an audible response to the user's request.

2. A method as recited in claim 1 further comprising converting the content of the audible utterance to a string of text characters after receiving the audible utterance from the user.

3. A method as recited in claim 1 wherein determining a user intent associated with the audible utterance includes identifying key words contained in the audible utterance.

4. A method as recited in claim 3 wherein determining a user intent associated with the audible utterance includes identifying a plurality of data elements contained in the ontology.

5. A method as recited in claim 1 further comprising:
  identifying key words contained in the audible utterance;
  identifying a plurality of data elements contained in the ontology;
  comparing the identified key words with the plurality of data elements contained in the ontology; and
  if the identified key words match a set of data elements contained in the ontology, associating that set of data elements with the user intent.

6. A method as recited in claim 1 further comprising generating an audible response to the user indicating that the user's request was not understood if a user intent associated with the audible utterance could not be determined.

7. A method as recited in claim 1 wherein the audible utterance is received in the natural language of the user.

8. A method as recited in claim 1 wherein generating an audible response to the user's request includes accessing at least one data source to obtain information necessary to respond to the user's request.

9. A method as recited in claim 1 wherein determining a user intent associated with the audible utterance includes identifying a root word associated with words contained in the audible utterance.

10. A method comprising:
  receiving an audible utterance at a dialog processor;
  attempting to determine a user intent associated with the audible utterance using an ontology that includes a plurality of words that may be contained in audible utterances, wherein the ontology defines relationships between the plurality of words that may be contained in audible utterances;
  if the user intent associated with the audible utterance is not determined, generating an audible response to the user indicating that the user's request was not understood;
  if the user intent associated with the audible utterance is determined:
    identifying a plurality of parameters associated with the user intent;
    determining whether any of the plurality of parameters associated with the user intent are missing from the audible utterance;
    if any of the plurality of parameters associated with the user intent are missing from the audible utterance, generating an audible response to the user requesting the missing parameters; and
    if all parameters associated with the user intent are contained in the audible utterance, generating an audible response to the user's request.

11. A method as recited in claim 10 wherein attempting to determine a user intent associated with the audible utterance includes:
  identifying key words contained in the audible utterance;
  identifying any root words associated with the key words contained in the audible utterance; and
  comparing the identified key words and root words with the plurality of words contained in the ontology.

12. A method as recited in claim 11 further comprising identifying the user intent by matching the identified key words and root words with a particular set of ontology data elements.

13. A method as recited in claim 10 wherein the audible utterance is spoken in the user's natural language.

14. A method as recited in claim 10 wherein the audible utterance is received from a telephone operated by the user.

15. An apparatus comprising:
    an ontology containing a plurality of data elements defining types of information that may be contained in user utterances, wherein the ontology defines relationships between words that may be contained in user utterances;
    a speech grammar generator coupled to the ontology, the speech grammar generator to generate a natural language grammar;
    a dialog manager coupled to the speech grammar generator, the dialog manager to receive user utterances and communicate responses to users;
    an intent identification engine coupled to the dialog manager and the ontology, the intent identification engine to determine a user's intent, wherein the user's intent has a plurality of associated parameters;
    a parameter qualifier coupled to the intent identification engine, the parameter qualifier to determine whether any parameters associated with a particular user's intent are missing from the associated user utterance; and
    a response generator coupled to the parameter qualifier, the response generator to generate responses to user utterances.

16. An apparatus as recited in claim 15 further comprising a data source coupled to the response generator, wherein the response generator accesses the data source when generating certain responses to user utterances.

17. An apparatus as recited in claim 15 wherein the dialog manager receives user utterances and communicates responses to users in the natural language of the user.

18. An apparatus as recited in claim 15 wherein the intent identification engine determines the user's intent by matching a particular set of data elements in the ontology with key words contained in the user's utterance.

19. An apparatus as recited in claim 15 further comprising a semantic factoring engine coupled to the dialog manager and the intent identification engine, the semantic factoring engine to identify key words contained in each user utterance and to identify root words associated with words contained in the each user utterance.

* * * * *